United States Patent [19]

Kaufmann

[11] 4,372,666

[45] Feb. 8, 1983

[54] AUTOMATIC VARIABLE-QUANTITY/VARIABLE-TIME ANTI-OXIDATION REPLENISHER CONTROL SYSTEM

[75] Inventor: Kenneth M. Kaufmann, Minneapolis, Minn.

[73] Assignee: Pako Corporation, Minneapolis, Minn.

[21] Appl. No.: 321,394

[22] Filed: Nov. 16, 1981

[51] Int. Cl.[3] ........................ G03D 3/06; G05D 11/00

[52] U.S. Cl. .................................... 354/298; 364/502; 137/93; 137/624.15; 222/639

[58] Field of Search ........................ 354/297, 298, 324; 355/10, 27; 250/559; 356/443, 444; 137/93, 624.15, 624.13; 222/638, 639, 642, 644, 646-648, 71; 364/500, 502

[56] References Cited

U.S. PATENT DOCUMENTS

| | | | |
|---|---|---|---|
| 3,472,132 | 10/1969 | Hixon et al. | 95/89 |
| 3,529,529 | 9/1970 | Schumacher | 95/89 |
| 3,554,109 | 1/1971 | Street | 95/89 |
| 3,559,555 | 2/1971 | Street | 95/89 |
| 3,561,344 | 2/1971 | Frutiger | 95/89 |
| 3,696,728 | 10/1972 | Hope | 95/89 |
| 3,752,052 | 8/1973 | Hope et al. | 95/89 |
| 3,787,689 | 1/1973 | Fidelman | 250/219 |
| 3,822,723 | 7/1974 | Crowell et al. | 137/624.15 |
| 3,927,417 | 11/1975 | Kinoshita et al. | 354/298 |
| 3,990,088 | 11/1976 | Takita | 354/298 |
| 4,057,818 | 11/1977 | Gaskell et al. | 354/298 |
| 4,104,670 | 8/1978 | Charnley et al. | 354/324 |
| 4,119,952 | 10/1978 | Takahashi et al. | 340/309 |
| 4,128,325 | 12/1978 | Melander et al. | 354/298 |
| 4,134,663 | 1/1979 | Laar et al. | 354/298 |
| 4,174,169 | 11/1979 | Melander et al. | 354/324 |

OTHER PUBLICATIONS

Luth, *Elektronic-Film-Processor* 1200/48" E.

Luth, *Elektronic-Film-Processor* LT600/24" E.

*Primary Examiner*—William B. Perkey

*Attorney, Agent, or Firm*—Kinney, Lange, Braddock, Westman and Fairbairn

[57] ABSTRACT

A processor of photosensitive material includes an automatic control system for providing anti-oxidation replenishment and preventing anti-oxidation overreplenishment, as a function of a stored anti-oxidation replenishment rate and anti-oxidation replenishment provided by exhaustion replenishment. A time interval of a predetermined duration is initiated by the control system. During the interval, the control system provides exhaustion replenishment based upon the area and density of photosensitive material processed. At the end of the interval, the control system compares the anti-oxidation replenishment required due to expired time to the amount of anti-oxidation replenishment provided by the exhaustion replenishment during that time interval. The control system then causes the needed amount of anti-oxidation replenishment to be added to the developer tank. If more anti-oxidation replenishment than needed was provided by the exhaustion replenishment, the control system extends the duration of the succeeding time interval as a function of the excess replenishment.

4 Claims, 2 Drawing Figures

AUTOMATIC VARIABLE-QUANTITY/VARIABLE-TIME ANTI-OXIDATION REPLENISHER CONTROL SYSTEM

CROSS REFERENCE TO PATENTS AND COPENDING APPLICATIONS

Reference is hereby made to my patents entitled AUTOMATIC REPLENISHER CONTROL SYSTEM, U.S. Pat. No. 4,293,211, issued Oct. 6, 1981; AUTOMATIC ANTI-OXIDATION REPLENISHER CONTROL, U.S. Pat. No. 4,295,792, issued Oct. 20, 1981; and the following copending applications: AUTOMATIC FIXED-QUANTITY/FIXED-TIME ANTI-OXIDATION REPLENISHER CONTROL SYSTEM, Ser. No. 321,619 filed Nov. 16, 1981; AUTOMATIC VARIABLE-QUANTITY/FIXED-TIME ANTI-OXIDATION REPLENISHER CONTROL SYSTEM, Ser. No. 321,392 filed Nov. 16, 1981; and AUTOMATIC FIXED-QUANTITY/VARIABLE-TIME ANTI-OXIDATION REPLENISHER CONTROL SYSTEM, Ser. No. 323,073 filed Nov. 19, 1981. All of these applications are assigned to the assignee of the present application.

BACKGROUND OF THE INVENTION

1. Field of the Invention

The present invention relates to an automatic anti-oxidation replenisher control system for use in processors of photosensitive material.

2. Description of the Prior Art

Automatic photographic film and paper processors transport sheets or webs of photographic film or paper through a sequence of processor tanks in which the photosensitive material is developed, fixed, and washed, and then transport the material through a dryer. It is well known that photographic processors require replenishment of the processing fluids to compensate for changes in the chemical activity of the fluids.

First, it has been recognized that replenishment is necessary to replace constituents used as photosensitive film or paper is developed in the processor. This replenishment is "use related" or "exhaustion" chemical replenishment. Both developer and fix solutions require exhaustion replenishment.

Second, chemical activity of the developer solution due to aerial oxidation occurs with the passage of time regardless of whether film or paper is being processed. Replenishment systems provide additional replenishment of an "anti-oxidation" (A-O) replenishment solution which counteracts this deterioration.

Replenishment systems were originally manually operated. The operator would visually inspect the processed film or paper and manually operate a replenishment system as he deemed necessary. The accuracy of the manual replenishment systems was obviously dependent upon the skill and experience of the operator.

Various automatic replenishment systems have been developed for providing use-related replenishment. Examples of these automatic replenishment systems include U.S. Pat. Nos. ,3,472,143 by Hixon et al; 3,529,529 by Schumacher; 3,554,109 by Street et al; 3,559,555 by Street; 3,561,344 by Frutiger et al; 3,696,728 by Hope; 3,752,052 by Hope et al; 3,787,686 by Fidelman; 3,927,417 by Kinoshita et al; 3,990,088 by Takita; 4,057,818 by Gaskell et al; 4,104,670 by Charnley et al; 4,119,952 by Takahashi et al; 4,128,325 by Melander et al; and 4,134,663 by Laar et al.

Examples of prior art replenisher controls for providing both exhaustion and anti-oxidation replenishment are shown in U.S. Pat. Nos. Re. 30,123 by Crowell et al and 4,174,169 by Melander et al. In particular, these patents show systems which are usable to control anti-oxidation replenishment when a type of anti-oxidation replenishment known as "blender chemistry" is used. Blender chemistry is based upon a "minimum daily requirement" of anti-oxidation replenishment. This minimum daily requirement is dependent upon the amount of aerial oxidation which occurs in the developer tank, which in turn is dependent upon the open surface area of the tank, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

Crowell discloses a variable quantity, fixed time anti-oxidation replenishment control in which a variable amount of anti-oxidation replenishment needed due to aging is determined at fixed time intervals based upon the replenishment provided by use or exhaustion replenishment during the time interval. At fixed time intervals, a needed amount of anti-oxidation replenishment is added, which varies from zero up to a predetermined maximum amount. The more exhaustion replenishment provided during the time interval, the less anti-oxidation replenishment is required. The apparatus in Crowell does not consider, however, the situation where more anti-oxidation replenishment than is needed is provided by the exhaustion replenishment. Thus overage can lead to an accumulated error in the Crowell system. Overreplenishment of anti-oxidation fluid will produce incorrect processing results, just as will underreplenishment. There is no recognition in Crowell that this error accumulation can occur, or of any way to resolve it. In addition, the system of Crowell et al is limited by its use of analog electronics and electromechanical cams, which make the system difficult to calibrate and limit the number of control options available to the user.

Melander et al discloses a fixed quantity, variable time anti-oxidation system based on a counter which is set to a predetermined value and then counted down over time to measure oxidation of processor fluid. When the counter reaches zero, a fixed amount of anti-oxidation replenisher is added. The counter is counted up to reflect anti-oxidation replenishment provided as a result of exhaustion replenishment.

SUMMARY OF THE INVENTION

The automatic control system of the present invention is a variable quantity, variable time anti-oxidation replenishment control system which adds a variable amount of anti-oxidation replenishment fluid to the developer tank at variable time intervals which vary as a function of exhaustion replenishment provided. The time at which this variable amount is added is determined by initiating a first fixed time interval, which is measured by a clock means. The amount of anti-oxidation replenishment provided as a result of the exhaustion replenishment during the time interval is used to provide a first replenishment signal. A stored anti-oxidation replenishment rate and the measured time are used to provide a second replenishment signal indicative of how much anti-oxidation replenishment is needed. The two signals are compared at the end of the time interval. If the second signal is equal to or greater than the first signal, an amount of anti-oxidation replenishment represented by the difference is supplied to the developer tank. If the first signal exceeds the second signal, the length of a subsequent time interval is increased as a function of the difference between the first and second signals. By considering and compensating for the excess anti-oxidation replenishment provided by exhaustion replenishment, the automatic control system of the present invention eliminates the overreplenishment of anti-oxidation fluid which occurs in prior art systems.

DETAILED DESCRIPTION OF THE PREFERRED EMBODIMENTS

Figure 1:
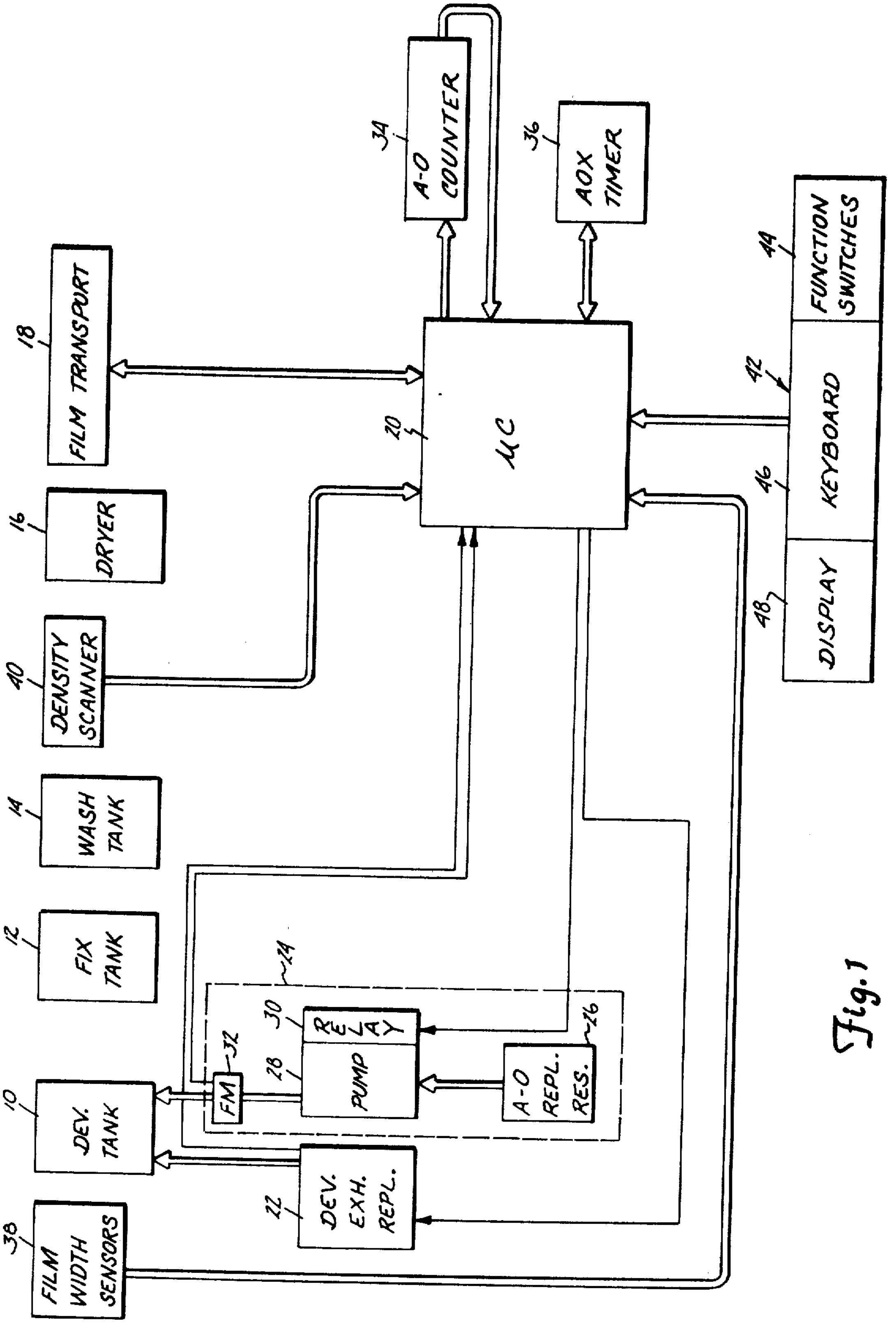
FIG. 1 is a block diagram illustrating a processor including a preferred embodiment of the automatic anti-oxidation replenishment control system of the present invention.

In the system shown in the FIG. 1, a photographic processor includes developer tank 10, fix tank 12, wash tank 14, and dryer 16. Film transport drive 18 transports a strip or web of photosensitive material (either film or paper) through tanks 10, 12, 14 and dryer 16. Microcomputer 20 controls operation of film transport 18 and of the automatic replenishment of fluids to tanks 10, 12 and 14.

The automatic replenishment system shown in FIG. 1 includes developer replenisher 22 and anti-oxidation replenisher 24 for providing exhaustion and anti-oxidation replenishment, respectively, to developer tank 10. Microcomputer 20 controls operation of developer replenisher 22 and receives a feedback signal indicating operation of developer replenisher 22. Although in a typical processor fix and wash replenishment also are provided, these functions are not a part of the present invention, and therefore are not shown or discussed herein.

Anti-oxidation replenisher 24 includes anti-oxidation (A-O) replenisher reservoir 26, pump 28, pump relay 30, and flow meter or switch 32. Anti-oxidation replenishment is supplied from A-O replenisher reservoir 26 to developer tank 10 by pump 28 by means of relay 30 which is controlled by microcomputer 20. Flow meter or switch 32 monitors flow of A-O replenishment to developer tank 10 and provides a feedback signal to microcomputer 20.

Microcomputer 20 utilizes A-O counter 34 as a timer to control anti-oxidation replenishment. When anti-oxidation replenishment is required, microcomputer 20 loads a numerical value (AOXTIME) into A-O counter 34, which then begins counting. Microcomputer 20 energizes relay 30, which activates pump 28. When developer counter 34 reaches a predetermined value (such as zero), it provides an interrupt signal to microcomputer 20, which deenergizes relay 30. The numerical value (AOXTIME), therefore, determines the total amount of anti-oxidation replenisher pumped into tank 10.

AOX timer 36 is a free running resettable timer which initiates and records a variable time interval. As described later, this time interval is used by microcomputer 20 in the control of anti-oxidation replenishment.

Microcomputer 20 receives signals from film width sensors 38 and density scanner 40. Film width sensors 38 are positioned at the input throat of the processor, and provide signals indicating the width of the strip of photosensitive material as it is fed into the processor. Since microcomputer 20 also controls film transport 18, and receives feedback signals from film transport 18, the width signals from film width sensors 38 and the feedback signals from film transport 18 provide an indication of the area of photosensitive material being processed.

Density scanner 40 senses density of the processed photosensitive material. The signals from density scanner 40 provide an indication of the integrated density of the processed photosensitive material. The integrated density, together with the area of material processed, provides an indication of the amount of processor fluids used or exhausted in processing that material.

Microcomputer 20 also receives signals from control panel 42, which includes function switches 44, keyboard 46, and display 48. Function switches 44 select certain functions and operating modes of the processor. Keyboard 46 permits the operator to enter numerical information, and other control signals used by microcomputer 20 in controlling operation of the processor, including the replenishment function. Display 48 displays messages or numerical values in response to control signals from microcomputer 20.

Microcomputer 20 preferably stores set values for each of a plurality of photosensitive materials that may be processed in the processor. Each group of set values includes a pump rate for pump 28 (AOXPMPRTE), and the desired replenishment rate of anti-oxidation replenishment (AOXRT).

When operation is commenced, the operator selects (through control panel 42) one of the groups of set values which corresponds to the particular photosensitive material being processed. As the leading edge of each strip of photosensitive material is fed into the processor, film width sensors 38 sense the presence of the strip, and provide a signal indicative of the width of the strip being fed into the processor. Width sensors 38 continue to provide the signal indicative of the width of the strip until the trailing edge of the strip passes sensors 38. The length of time between the leading and trailing edges of the material passing sensors 38, and the transport speed of the material (which is controlled by microcomputer 20 through film transport 18) provide an indication of the length of the strip. The width and length information for each strip is stored until the strip has been transported through the processor and reaches density scanner 40. The area of the strip and the integrated density of the strip (which is provided by the signals from density scanner 40), provide an indication of the amount of developer which has been exhausted in processing that particular strip.

As discussed previously, the present invention relates to the type of an anti-oxidation replenishment known as "blender chemistry". Blender chemistry is based upon a "minimum daily requirement" of anti-oxidation replenishment. This minimum daily requirement is dependent upon the amount of aerial oxidation which occurs in developer tank 10, which in turn is dependent upon the open surface area of tank 10, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

The anti-oxidation replenishment control system shown in FIG. 1 uses pump 28 to transfer the necessary amount of anti-oxidation replenisher from anti-oxidation replenisher reservoir 26 to developer tank 10. A-O counter 34 is used to measure the amount of time that pump 28 will run, so that the correct amount is transferred to developer tank 10. When microcomputer 20 activates relay 30 to start pump 28, A-O counter 34 begins timing. When the proper amount of anti-oxidation replenishment has been transmitted, pump 28 is stopped. Flow meter or switch 32 provides to microcomputer 20 a feedback signal indicating that anti-oxidation replenisher has been provided to developer tank 10.

The addition of anti-oxidation replenisher is generally as follows. When operation is first commenced, AOX timer 36, under the control of microcomputer 20, initiates a first standard minimum time interval. During this time interval, exhaustion replenishment is provided, as needed, by exhaustion replenisher 22 under the control of microcomputer 20. This is done, as discussed above, as a function of the use of the developer fluid in tank 10. The use is indicated by the signals from film width sensors 38, density scanner 40, and film transport 18. Microcomputer 20 then determines and starts to accumulate a first signal representing the amount of anti-oxidation replenishment supplied as a result of that exhaustion replenishment during the time interval (AOXDEV).

At the end of the first time interval, microcomputer 20 uses a stored anti-oxidation replenishment rate (AOXRT) and the time expired in the interval (AOXTM), as measured by AOX timer 36, to determine a second signal (AOXRT×AOXTM) which indicates the amount of anti-oxidation replenishment required in the current time interval. Microcomputer 20 then compares the first signal (AOXDEV) indicating the amount of anti-oxidation replenishment supplied in the interval as a result of the exhaustion replenishment with the second signal (AOXRT×AOXTM) indicating anti-oxidation replenishment required at the current time in the interval.

If the first signal is greater than the second signal, no anti-oxidation replenishment is required and the microcomputer 20 extends the next time interval to a length which is greater than the standard minimum interval as a function of the amount by which the first signal exceeds the second signal. Microcomputer 20 then initiates the next time interval and goes on with its normal operating steps.

If, on the other hand, the second signal is greater than the first signal, the microcomputer 20 activates anti-oxidation replenisher 24 to provide the needed amount of anti-oxidation replenisher to developer tank 10. This needed amount is based upon the amount by which the second signal exceeds the first signal. The next time interval is the initiated and is given a length equal to the standard minimum interval.

The following table illustrates how microcomputer 20 determines and controls anti-oxidation replenishment in accordance with the embodiment of the present invention. AOXREPL is a variable quantity of anti-oxidation replenishment fluid. AOXPER is a value in seconds which represents the period until the next calculation of anti-oxidation replenishment. In other words, AOXPER is the value of AOXTM at the end of the time interval. AOXPER is initially set to the standard minimum interval, for example, 22.5 minutes. AOXRT is the amount of replenishment needed per second.

TABLE

| | |
|---|---|
| 1 | AOX timer 36 reaches AOXPER |
| 2 | AOXREPL = (AOXRT × AOXPER) − AOXDEV |
| 3 | if AOXREPL is less than zero<br>(a) AOXNEG = AOXREPL<br>(b) reset AOXDEV<br>(c) complement AOXNEG<br>(d) AOXPER = (AOXNEG / AOXRATE) + (22.5 min. × 60)<br>(e) go to 1<br>(f) else reset AOXDEV |
| 4 | AOXTIME = AOXREPL / AOXPMPRTE + AOXMINRUN |
| 5 | If AOXTIME less than 7.5 seconds then<br>(a) Calculate AOXMINRUN + AOXMINRUN = AOXTIME<br>(b) Return to 1.1 |
| 6 | Output AOXTIME to counter 34 |
| 7 | Trigger pulse sent to counter 34 and<br>(a) Replenish flag (AOX) set |
| 8 | Counter 34 begins decrementing and<br>(a) Anti-ox replenishment pump 28 runs<br>(b) When counter 34 times out, go to 11 |
| 9 | If flow switch 32 does not activate and/or Anti-ox replenishment pump relay 30 does not energize then ERROR |
| 10 | If pump enable is turned off while counter 34 is running then<br>(a) Wait 5 seconds<br>(b) If change then resume 8<br>Else<br>(1) Read value remaining in counter 34 to AOXREM<br>(2) Clear counter 34<br>(3) Replenish flag (AOX) reset<br>(4) Return to 1 |
| 11 | Counter 34 times out and<br>(a) Interrupt request generated |
| 12 | If interrupt request not acknowledged then wait;<br>Else |
| 13 | If flow switch 32 remains activated and/or pump relay 30 remains energized then ERROR;<br>Else |
| 14 | Reset replenish (AOX) flag and AOX not complete flag and clear AOXMINRUN |

Figure 2:
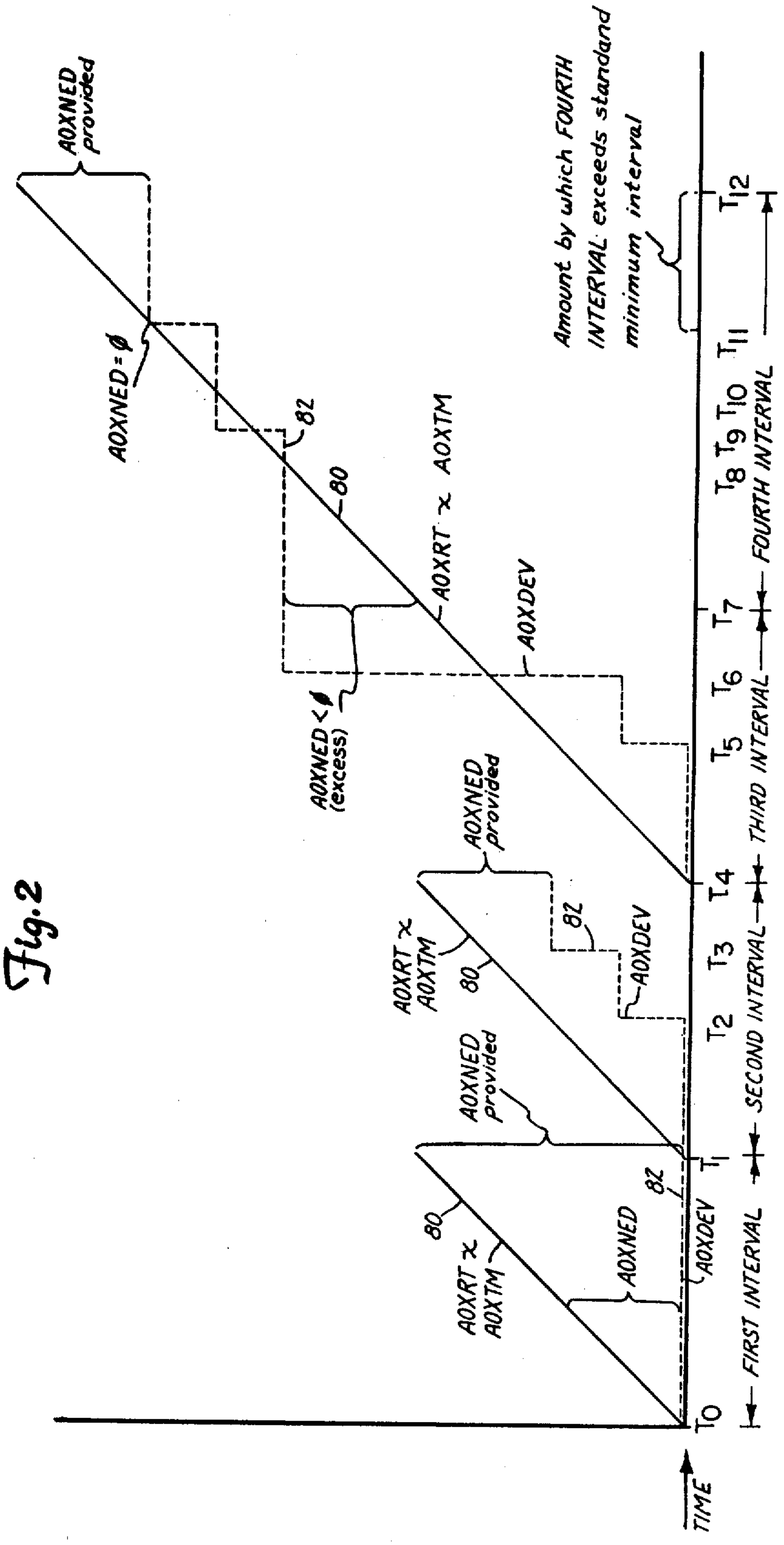
FIG. 2 is a graph illustrating the operation of the control system of the present invention.

FIG. 2 is a graphic representation of the process described in the Table. The horizontal axis represents expired time, starting at initialization point $T_0$. Slanted curve 80 shows the need for anti-oxidation replenishment, which increases at a steady rate as a function of the stored anti-oxidation replenishment rate (AOXRT) and expired time in the interval (AOXTM). Dashed curve 82 shows anti-oxidation replenishment provided by exhaustion replenishment (AOXDEV). The vertical distance between curves 80 and 82 (AOXNED) equals the difference between needed anti-oxidation replenishment due to time (AOXRT×AOXTM) and AOXDEV.

A first time interval (with a length equal to the standard minimum interval) is initiated at $T_0$ and extends to time $T_1$. During this first interval, no exhaustion replenishment occurs. At the end of the interval, the difference between curves 80 and 82 shows the amount of needed anti-oxidation replenishment (AOXNED=(AOXRT×AOXTM)−AOXDEV). This amount is added at time $T_1$. At this point, a second time interval of the same length is initiated, and extends from time $T_1$ to time $T_4$. During this second interval, exhaustion replenishment occurs at times $T_2$ and $T_3$, which is shown by the vertical portions of the curve 82. At the end of the second fixed time interval, the difference (AOXNED) which is provided is smaller than the replenishment at $T_1$, since exhaustion replenishment in the second interval provided some anti-oxidation replenishment.

Once again at $T_4$, a third time interval equal to the standard minimum interval is initiated. This third time interval extends from time $T_4$ to time $T_7$. During this third time interval, exhaustion replenishment occurs at times $T_5$ and $T_6$. The replenishment at time $T_6$ moves curve 82 above curve 80. Therefore from time $T_6$ to time $T_8$ (in the fourth interval), the system is slightly overreplenished; i.e., AOXNED is less than zero. When the third interval ends at time $T_7$, curve 82 is above curve 80. Because the system is overreplenished, no anti-oxidation replenishment is needed and none is provided. The counters are not reset and calculations continue.

A fourth time interval is initiated at time $T_7$. Because the system is overreplenished, however, the fourth time interval is extended by microcomputer 20. Normally the fourth time interval would extend from time $T_7$ to time $T_{11}$. Because the system is overreplenished, the interval is extended to time $T_{12}$. The time indicated between $T_{11}$ and $T_{12}$ represents the time needed to use up the excess replenishment indicated at $T_7$. This extension of the time interval reduces the frequency of computations by microcomputer 20. During the fourth interval, exhaustion replenishment occurs at times T9 and $T_{11}$. When the interval ends at time $T_{12}$, an amount of replenishment (AOXNED) is needed and added. The microcomputer 20 then reinitializes its counters and initiates a new interval equal in length to the standard minimum interval.

The variable quantity anti-oxidation replenishment system of the present invention is particularly advantageous where precise accuracy is needed. By varying the quantity, the system prevents significant underage or overage in anti-oxidation replenisher fluid. The system of the present invention also takes advantage of the precise computational and control capabilities of a microcomputer 20. It provides control of anti-oxidation replenishment which is far more accurate and flexible than the prior art system shown in the Crowell patent, in that it utilizes digital electronics rather than analog electro-mechanical devices, and it avoids the accumulated overreplenishment error which can occur with the Crowell system.

Although the present invention has been described with reference to preferred embodiments, workers skilled in the art will recognize that changes may be made in form and detail without departing from the spirit and scope of the invention.

What is claimed is:

1. A control system for controlling anti-oxidation replenisher means to provide anti-oxidation replenisher to a processor of photosensitive material, the control system comprising:

means for measuring a time interval and providing a clock signal at the end of the interval;

means for storing an exhaustion replenishment rate;

means for storing an anti-oxidation replenishment rate;

means for providing exhaustion replenishment during the time interval as a function of the use of processor fluid and the exhaustion replenishment rate;

means for providing a first signal indicative of an accumulated amount of anti-oxidation replenishment supplied as a result of the exhaustion replenishment during the time interval;

means for providing a second signal indicative of the amount of anti-oxidation replenishment required during the time interval as a function of expired time and the stored anti-oxidation replenishment rate;

means responsive to the clock signal for comparing the first signal and the second signal at the end of the time interval;

means for providing an amount of anti-oxidation replenishment at the end of the interval, if the second signal exceeds the first signal, in an amount which is a function of the amount by which the second signal exceeds the first signal;

means for extending a subsequent time interval, if the first signal exceeds the second signal, by an amount of time which is a function of the amount by which the first signal exceeds the second signal.

2. The apparatus of claim 1 wherein:

the first and second replenishment signals are digital signals;

the anti-oxidation replenishment rate and exhaustion replenishment rate are stored as digital data; and the means for comparing the first and second replenishment signals is a programmed digital computer.

3. A method of providing replenishment to processor fluid in a processor of photosensitive material, the method comprising:

(a) commencing a time interval;

(b) providing exhaustion replenishment during the time interval as a function of use of processor fluid;

(c) providing a first replenishment signal indicative of an accumulated amount of anti-oxidation replenishment supplied as a result of the exhaustion replenishment during the time interval;

(d) providing a second replenishment signal indicative of an amount of anti-oxidation replenishment required during the time interval as a function of a stored anti-oxidation replenishment rate;

(e) comparing the first and second replenishment signals at an end of the time interval;

(f) providing anti-oxidation replenishment in an amount which is a function of a difference between the first and second replenishment signals if the second replenishment signal exceeds the first replenishment signal; and (g) providing no anti-oxidation replenishment at the end of the time interval if the first replenishment signal exceeds the second replenishment signal and extending a subsequent time interval by a time period which is a function of the amount by which the first signal exceeds the second replenishment signal; and (h) commencing the subsequent time interval in which steps (b)-(g) are repeated.

4. A computer-based control system for controlling anti-oxidation replenisher means for providing anti-oxidation replenishment to a processor of photosensitive material, the control system comprising:

clock means for measuring a time interval and providing a clock signal at the end of the interval;

exhaustion replenishment means responsive to a first replenishment signal for providing exhaustion replenishment;

means for providing a signal indicative of use of processor fluid;

anti-oxidation replenishment means responsive to a second replenishment signal for providing anti-oxidation replenishment; and programmed digital computer means for:

storing a digital value representing an exhaustion replenishment rate;

receiving the signal indicative of use of processor fluid;

receiving the clock signal from the clock means;

storing a digital value representing an anti-oxidation replenishment rate;

providing the first replenishment signal to the exhaustion replenishment means as a function of the signal indicative of use of processor fluid and the digital value representing the exhaustion replenishment rate;

providing a first digital replenishment value indicative of an accumulated amount of anti-oxidation replenishment provided by exhaustion replenishment during the time interval;

providing a second digital replenishment value indicative of the anti-oxidation replenishment needed as a function of the stored digital value representing the anti-oxidation replenishment rate and expired time since a last previous anti-oxidation replenishment by the anti-oxidation replenishment means;

comparing the first replenishment value with the second replenishment value at the end of the time interval in response to the clock signal;

providing the second replenishment signal to cause the anti-oxidation replenishment means to provide an amount of anti-oxidation replenishment which is a function of the difference by which the second replenishment value exceeds the first replenishment value; and providing a signal to the clock means for extending a subsequent time interval, if the first value exceeds the second value, by an amount of time which is a function of the amount by which the first replenishment value exceeds the second replenishment value.

* * * * *